May 26, 1936.  H. A. HENSEL  2,042,227
SAUSAGE CASING AND METHOD OF CLOSING THE SAME
Filed Dec. 7, 1935
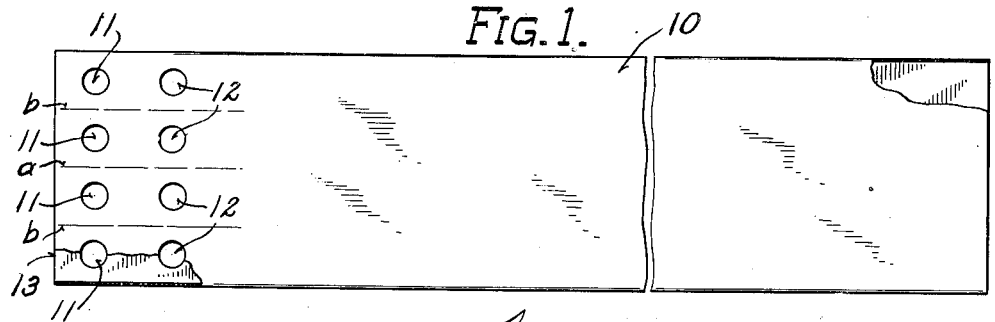
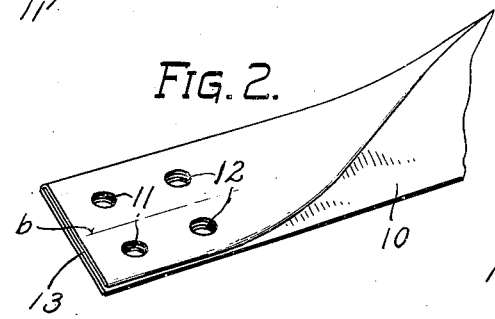
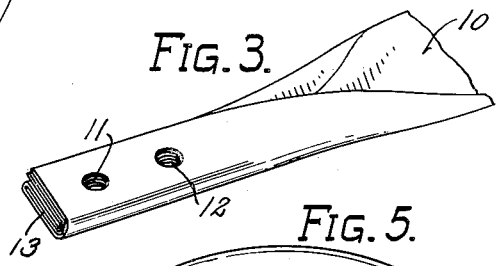
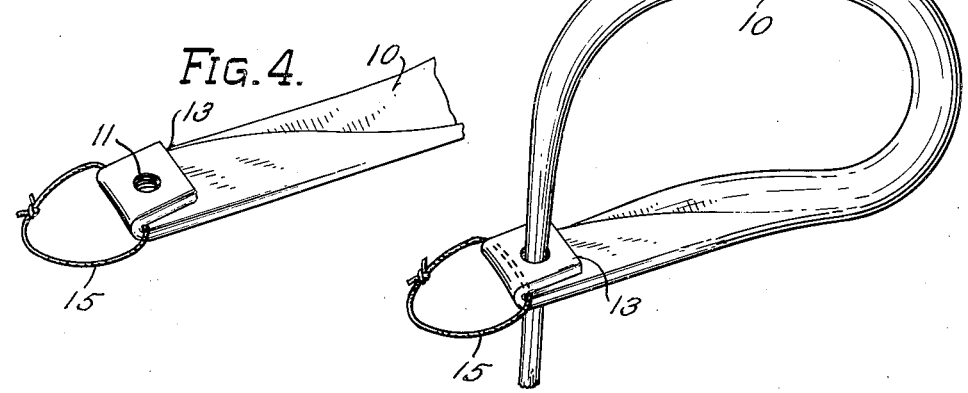
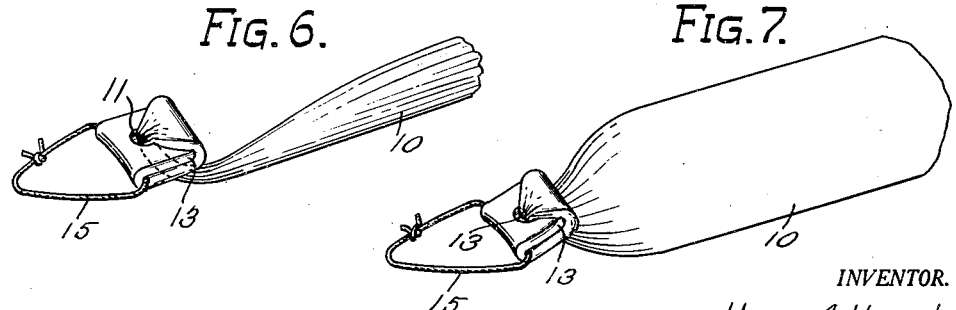
INVENTOR.
Henry A. Hensel
BY
*Ralph W. Brown*
ATTORNEY.

Patented May 26, 1936

2,042,227

UNITED STATES PATENT OFFICE 2,042,227

SAUSAGE CASING AND METHOD OF CLOSING THE SAME

Henry A. Hensel, Milwaukee, Wis.

Application December 7, 1935, Serial No. 53,326

26 Claims. (Cl. 99—175)

This invention relates to sausage casings and particularly to method and means for closing the same.

Artificial casings, now commonly used in the production of large sausages, such as summer sausages and the like, are produced in flat tubular form cut to the desired length. Preparatory to stuffing, the casings are ordinarily soaked in water to render the normally stiff material thereof soft and pliable and then each is closed at one end by manually drawing and tying a special kind of string tightly about it.

As heretofore applied the string must be sufficiently secure and tight to withstand the heavy pressures developed during the subsequent stuffing operation and to thereafter serve as a hanger or support for the finished sausage during the final smoking operation. The strings, however, frequently become loose during the stuffing operation and many times fail as supports during the smoking operation and are thus a common cause of defective sausages and a substantial loss.

Furthermore the application and tying of the strings is a difficult and tedious task and very hard on the hands of the tier.

An object of the present invention is to provide a novel and effective method and means for securely closing the end of a sausage casing in a manner to avoid the above mentioned objections and difficulties.

More specific objects and advantages will appear, expressed or implied, from the following description of an illustrative embodiment of the present invention.

In the accompanying drawing:—

Figure 1 is a plan view of an artificial sausage casing adapted to permit the secure closing of one end thereof in accordance with the present invention.

Figs. 2, 3, 4, 5 and 6 are perspective views of a casing end respectively illustrating successive steps in the closing process.

Fig. 7 is a similar view showing the closed casing end stuffed.

The sausage casing shown in Fig. 1 is of a type commonly known as an artificial casing and comprises, as usual, a length of transparent material 10 in flat tubular form.

Preparatory to stuffing the same, the casing is closed at one end in a novel manner by knotting the same upon itself, the casing preferably being first soaked in water to render the material soft and pliable.

In this instance a plurality of perforations 11 and 12 are provided adjacent one end of the casing to facilitate the closing or knotting operation. The number and arrangement of the perforations may be varied according to the particular form of knot to be made, but in this instance two transverse series of perforations are provided, the outer series 11 being arranged close to the end 13 of the casing and the inner series 12 being spaced inwardly from the outer series.

To close an end of the casing shown, the end portion thereof containing the perforations is first longitudinally folded along the line $a$ into the form shown in Fig. 2 and again folded along the lines $b$ into the form shown in Fig. 3 in such manner as to cause all the perforations of each series to register. Thereafter the end 13 of the casing is folded back upon the casing into the position shown in Fig. 4 so as to register all of the perforations 11 of one series with the perforations 12 of the other series. Finally the casing, compressed or compacted into narrow rope-like form, is projected or threaded through the registered perforations, as indicated in Fig. 5, and drawn tight to form the knot shown in Fig. 6.

It will thus be noted that this novel engagement of the perforated portion of the casing with the adjacent portion, which extends through it, provides a secure interlock between those portions and that, when thus arranged, the perforated portion encircles the said adjacent portion to grip and close the same, the tightness in the closure being assured by the sharp bend in the material of the casing within the knot formation thus provided.

It has been found that the knot thus formed provides a secure closure which is well able to withstand the pressures developed during the stuffing operation.

The knot also provides a convenient and secure means for attaching a suitable hanger to the casing. For instance a hanger in the form of a cord 15 or the like may be inserted into the fold, as indicated in Fig. 4, prior to threading the casing through the perforations.

Various changes may be made in the embodiment of the invention hereinabove specifically described without departing from or sacrificing the advantages of the invention as defined in the appended claims.

I claim:—

1. A sausage casing having the material thereof knotted upon itself at one end to close the same.

2. A filled sausage casing having the material thereof knotted upon and through itself to close the same.

3. The combination of a sausage casing having the material thereof knotted upon itself at one end to close the same, and an independently formed tie engaged in the knotted portion.

4. A sausage casing having a portion extending through an end portion thereof to form a knot to thereby close the same.

5. The combination of a sausage casing having a portion extending through an end portion thereof to form a knot to thereby close the same, and an independently formed tie engaged in said knot.

6. A sausage casing having an end portion folded upon itself, and another portion extending through the material of said folded portion to form a knot.

7. A sausage casing having a plurality of perforations formed in an end portion thereof, said end portion being folded to register said perforations, and said casing having another portion extending through said perforations to form a knot thereby to close that end of the casing.

8. A sausage casing having two sets of perforations formed in an end portion thereof, said end portion being folded longitudinally to register the perforations of each set and folded transversely to register the perforations of one set with the perforations of the other set, and said casing having another portion extending through said registered perforations to form a knot.

9. A sausage casing comprising a flattened tubular structure having two sets of perforations formed in an end portion thereof to admit another portion of the casing therethrough.

10. A sausage casing comprising tubular structure having one portion perforated to admit another portion of the casing therethrough.

11. A sausage casing comprising a tubular structure having one end perforated to admit another portion of the casing therethrough.

12. A sausage casing comprising a tubular structure having an end portion thereof with a cut to receive and interlock with an adjacent portion thereof to form a secure end closure therefor.

13. A sausage casing comprising a tubular structure having a portion thereof with a cut to receive and interlock with another portion thereof to form a secure closure for the casing.

14. A sausage casing comprising a tubular structure having adjacent portions at one end thereof in interlaced relation one through the material of another to form a secure end closure therefor.

15. A sausage casing comprising a tubular structure having adjacent portions in interlaced relation one through the material of another to form a secure closure for the casing.

16. A tubular sausage casing having one of two adjacent portions at one end thereof extending through and in encircling relation to a part of the other of said portions to close the casing.

17. A tubular sausage casing having one of two adjacent portions extending through and in encircling relation to a part of the other of said portions to close the casing.

18. A filled sausage casing comprising a tubular structure having an end portion thereof doubled back upon itself in substantially parallel relation along a transverse fold to close the same, and an independently formed flexible member engaged therewith within the fold.

19. The method of closing a tubular sausage casing which consists in passing one portion thereof through the material of another portion thereof whereby the latter portion surrounds the first named portion.

20. The method of closing a tubular sausage casing which consists in disposing an end portion thereof through the casing material to encircle and grip an adjacent portion.

21. The method of closing the end of a tubular sausage casing which consists in doubling back an end portion thereof upon itself in a plurality of different directions and interlocking said end portion through an adjacent portion of the casing material to retain the fold.

22. The method of closing an end of a tubular sausage casing which consists in interlacing adjacent portions one through the material of another at one end of the casing.

23. The method of closing an end of a sausage casing which consists in passing a portion of said casing through an end portion thereof and drawing said first named portion tight to form a knot.

24. The method of closing an end of a sausage casing which consists in perforating an end portion thereof, and passing another portion of said casing through said perforated portion to form a knot.

25. The method of closing an end of a sausage casing which consists in forming a plurality of perforations in an end portion therein, folding said end portion to register said perforations, and passing another portion of said casing through said registered perforations to form a knot.

26. The method of closing an end of a sausage casing which consists in forming two sets of perforations in an end portion thereof, folding said end portion to register the perforations of each set, folding said end portion to register the perforations of one set with the perforations of the other set, and passing another portion of said casing through said perforations to form a knot.

HENRY A. HENSEL.